(12) United States Patent
Ishikawa

(10) Patent No.: US 12,166,628 B2
(45) Date of Patent: Dec. 10, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Akira Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 18/062,466

(22) Filed: Dec. 6, 2022

(65) Prior Publication Data

US 2023/0179478 A1 Jun. 8, 2023

(30) Foreign Application Priority Data

Dec. 8, 2021 (JP) ................. 2021-199139

(51) Int. Cl.
*H04L 41/0816* (2022.01)
*G06F 3/0482* (2013.01)
*H04L 9/40* (2022.01)

(52) U.S. Cl.
CPC ........ *H04L 41/0816* (2013.01); *G06F 3/0482* (2013.01); *H04L 63/101* (2013.01)

(58) Field of Classification Search
None
See application file for complete search history.

(56) References Cited

U.S. PATENT DOCUMENTS

| 9,467,333 | B2 * | 10/2016 | Lin ..................... H04L 41/0803 |
| 2004/0114601 | A1 | 6/2004 | Watanabe et al. |
| 2009/0217346 | A1 * | 8/2009 | Manring ............... H04L 63/102 726/1 |
| 2013/0304880 | A1 * | 11/2013 | Lin ..................... H04L 41/0803 709/220 |

FOREIGN PATENT DOCUMENTS

JP 2004094736 A 3/2004

* cited by examiner

*Primary Examiner* — Quang N Nguyen
(74) *Attorney, Agent, or Firm* — Canon U.S.A., Inc. IP Division

(57) ABSTRACT

An information processing apparatus includes a request unit configured to transmit a request to acquire network configuration information about a dynamic host configuration protocol (DHCP) server that assigns address information to the information processing apparatus, a storage unit configured to store as first network configuration information the network configuration information acquired based on the request, a detection unit configured to detect a change based on the first network configuration information stored in the storage unit and second network configuration information acquired newly by the request unit, and a display control unit configured to display a first display item on a screen based on the detection of the change, the first display item relating to a setting of a security-related function of the information processing apparatus.

16 Claims, 13 Drawing Sheets

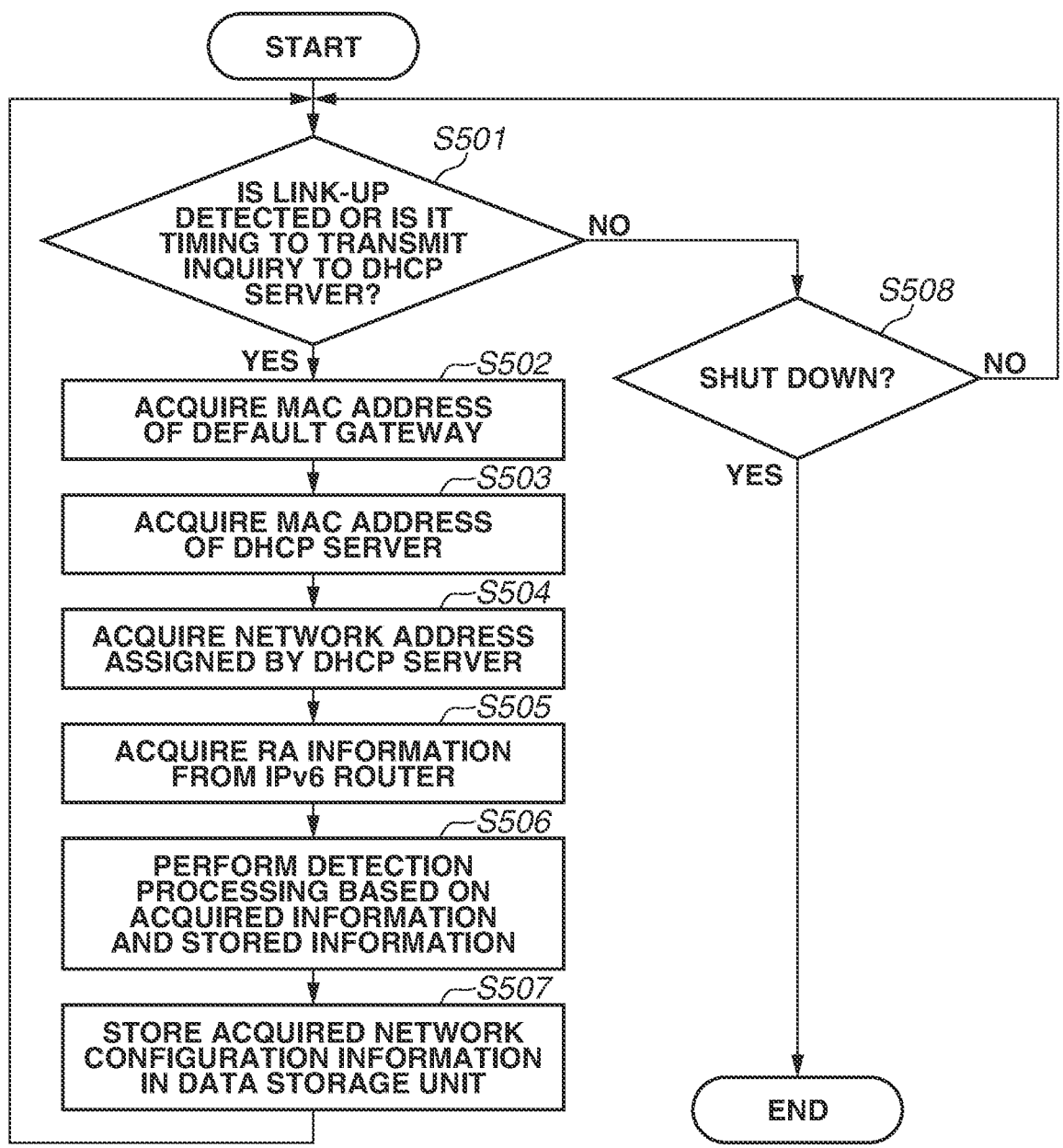

FIG.13A

MANAGEMENT SCREEN    DEVICE No. 99999999

| NETWORK DIAGNOSTIC STATUS | NO CHANGE DETECTED | ~1102 |

MANAGEMENT SCREEN    DEVICE No. 99999999

| NETWORK DIAGNOSTIC STATUS | CHANGE DETECTED | ~1112 |

CURRENT NETWORK CONFIGURATION IS DIFFERENT FROM NETWORK CONFIGURATION IN PREVIOUS CONNECTION. IT IS RECOMMENDED TO CHECK SECURITY SETTINGS. ~1113

SECURITY SETTING MANUAL

LIST OF RECOMMENDED SECURITY SETTINGS FOR INTERNAL LAN ~1114

LIST OF RECOMMENDED SECURITY SETTINGS FOR HOME ~1115

LIST OF RECOMMENDED SECURITY SETTINGS FOR PUBLIC SPACE ~1116

INFORMATION PROCESSING APPARATUS, INFORMATION PROCESSING METHOD, AND STORAGE MEDIUM

BACKGROUND

Field of the Disclosure

The present disclosure relates to an information processing apparatus that provides setting information about security-related functions of an information device to a user.

Description of the Related Art

In recent years, more and more information devices are used in various environments such as work-from-home environments and public spaces shared by an unspecified number of people. Further, information devices connected to a network are sometimes exposed to various security risks. Thus, general information devices have the setting function of setting security-related functions based on user operations.

Further, Japanese Patent Application Laid-Open No. 2004-94736 discusses a technique for changing to a prepared network setting for a network environment where an information processing apparatus is used.

As information devices are in widespread use in recent years, more and more users without expert security knowledge manage information devices. Japanese Patent Application Laid-Open No. 2004-94736 does not consider notifying setting information about security-related functions of an information device to a user when a change occurs in a network environment. Thus, the user continues to use the information device without changing settings of security-related functions that are desirable to be changed depending on the change in the network environment.

SUMMARY

Aspects of the present disclosure are directed to providing an information processing apparatus that provides setting information about security-related functions of an information device to a user when a change occurs in a network environment.

According to an aspect of the present disclosure, an information processing apparatus includes a request unit configured to transmit a request to acquire network configuration information about a dynamic host configuration protocol (DHCP) server that assigns address information to the information processing apparatus, a storage unit configured to store as first network configuration information the network configuration information acquired based on the request, a detection unit configured to detect a change based on the first network configuration information stored in the storage unit and second network configuration information acquired newly by the request unit, and a display control unit configured to display a first display item on a screen based on the detection of the change, the first display item relating to a setting of a security-related function of the information processing apparatus.

Further features of various embodiments will become apparent from the following description of exemplary embodiments with reference to the attached drawings.

BRIEF DESCRIPTION OF THE DRAWINGS

FIG. 5 is a flowchart illustrating an example of a network configuration information acquisition process performed by the MFP according to a first exemplary embodiment.

FIGS. 13A and 13B each illustrate an example of a screen displayed on a personal computer (PC) according to the fourth exemplary embodiment.

DESCRIPTION OF THE EMBODIMENTS

Various exemplary embodiments of the present disclosure will be described below with reference to the drawings. It should be noted that the exemplary embodiments described below are not intended to limit the scope of every embodiment and that not all combinations of features described in the exemplary embodiments are used in all of the technical solutions provided by the present disclosure.

Figure 1:
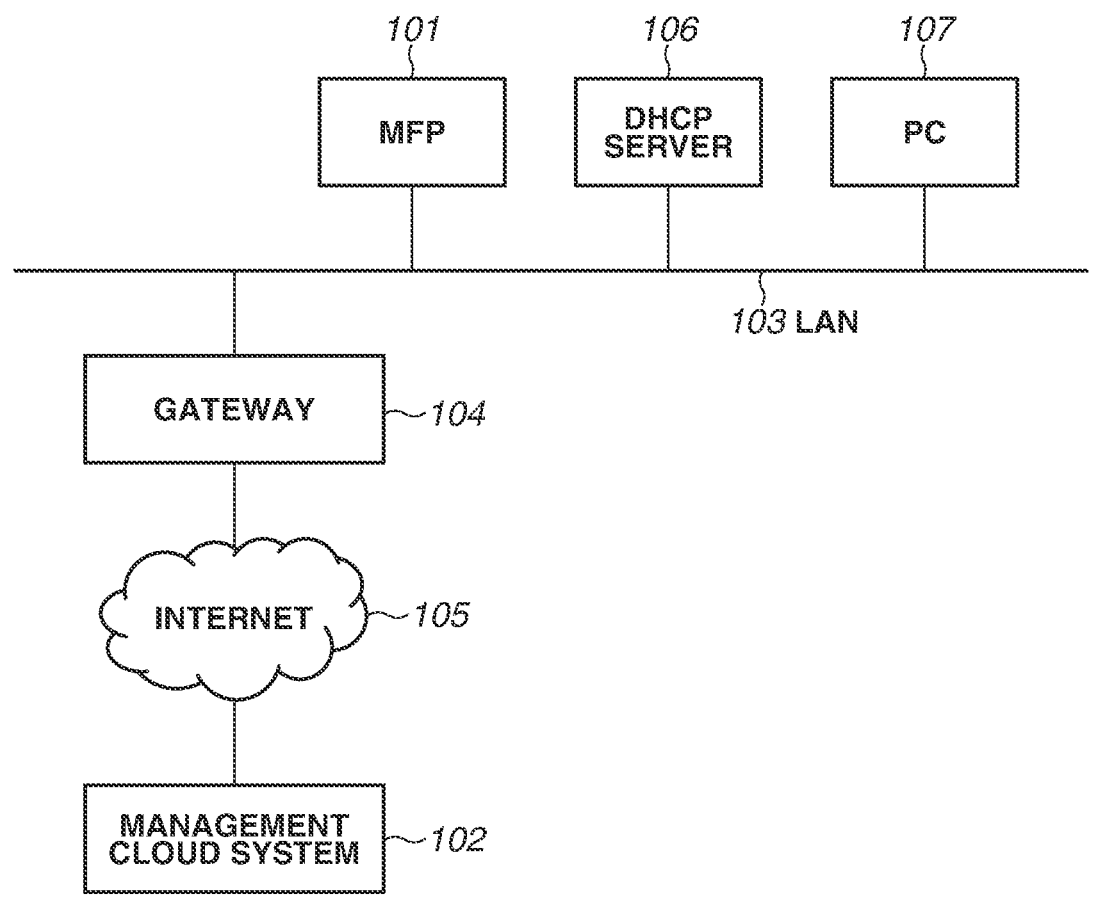
FIG. 1 illustrates an example of a communication system.

First, the configuration of a communication system according to a first exemplary embodiment will be described below with reference to FIG. 1. In the communication system according to the present exemplary embodiment, a multi-function peripheral (MFP) 101 and a management cloud system 102 are connected together via a local area network (LAN) 103, a gateway 104, and the Internet 105. The management cloud system 102 is a server that collects information from the MFP 101 and remotely monitors the state of the MFP 101. Further, the gateway 104 is a network router that relays communications from the MFP 101 to the Internet 105.

The MFP 101, a dynamic host configuration protocol (DHCP) server 106, and a personal computer (PC) 107 are connected together via the LAN 103.

<Hardware Configuration of MFP 101>

Figure 2:
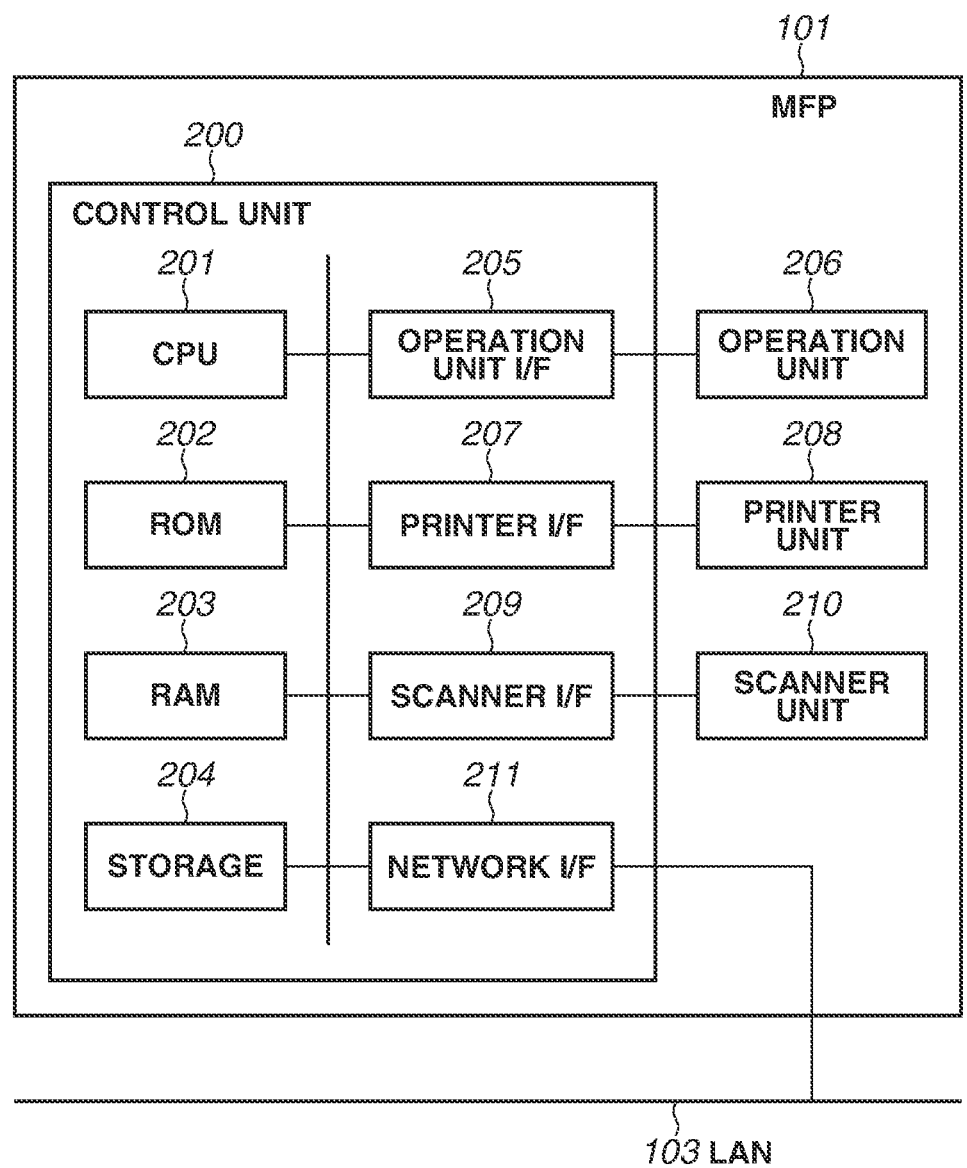
FIG. 2 illustrates an example of the hardware configuration of a multi-function peripheral (MFP).

Next, a hardware configuration of the MFP 101 will be described below with reference to FIG. 2. The MFP 101 is an example of an information device according to the present exemplary embodiment.

The MFP 101 includes a printer unit 208 and a scanner unit 210. The printer unit 208 outputs electronic data to a paper medium. The scanner unit 210 reads a paper medium and converts the reading result into electronic data. While the MFP 101 that has a plurality of functions is described as an example of an information device of a communication system according to the present exemplary embodiment, an information device of a communication system according to the present exemplary embodiment is not limited to the MFP 101. For example, a single-function scanner or a single-function printer can be used. Further, a three-dimensional (3D) printer or a 3D scanner can be used.

A control unit 200 including a central processing unit (CPU) 201 controls the overall operations of the MFP 101. A read-only memory (ROM) 202 is used to store programs to be run by the CPU 201. A random access memory (RAM) 203 is used as a work memory for temporarily storing data for use by the CPU 201. A storage 204 stores print jobs, image data, various programs, and various types of setting information. As described above, the foregoing hardware components such as the CPU 201, the ROM 202, the RAM 203, and the storage 204 constitute a so-called computer.

An operation unit interface (operation unit I/F) 205 connects an operation unit 206 and the control unit 200 together.

The operation unit 206 includes a liquid crystal display unit that has a touch panel function and various hardware keys. The operation unit 206 functions as a display unit that displays information to a user and as a reception unit that receives user instructions.

A printer interface (printer I/F) 207 connects the printer unit 208 and the control unit 200 together. The MFP 101 performs output processing on a paper medium based on print data input to the printer unit 208 via the printer I/F 207. A scanner interface (scanner I/F) 209 connects the scanner unit 210 and the control unit 200 together.

The scanner unit 210 (e.g., a scanner) reads a document placed on a glass platen (not illustrated) and generates read image data.

A network cable is connected to a network interface (network I/F) 211, and the network I/F 211 can communicate with external apparatuses on the LAN 103. While the network I/F 211 is assumed to be a communication interface that performs wired communication according to the present exemplary embodiment, the network I/F 211 is not limited to a communication interface that performs wired communication. For example, the network I/F 211 can be a wireless communication interface.

<Software Configuration of MFP 101>

Figure 3:
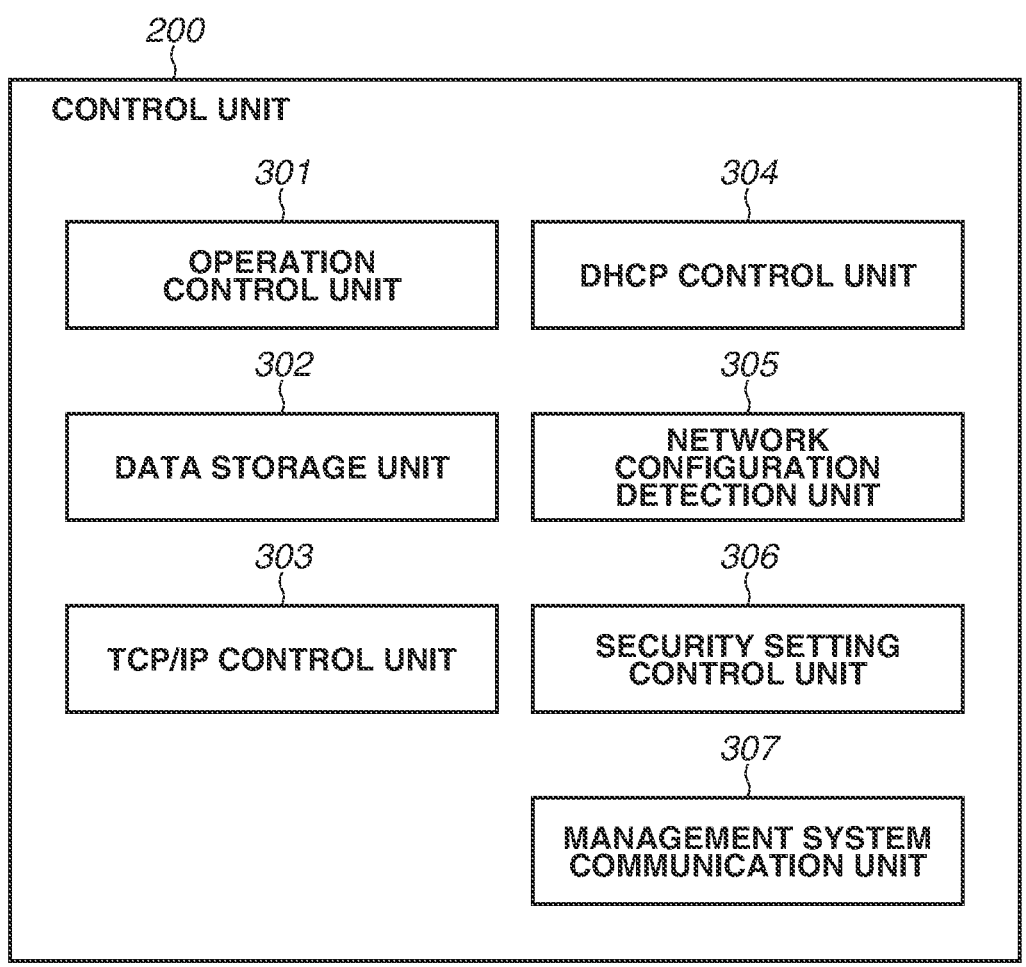
FIG. 3 illustrates an example of a software configuration of the MFP.

Next, a software configuration of the MFP 101 will be described below with reference to FIG. 3. The MFP 101 is an example of an information device according to the present exemplary embodiment. Each component illustrated in FIG. 3 is implemented by the CPU 201 running a program that corresponds to the component and is stored in the ROM 202.

An operation control unit 301 displays on the operation unit 206 a screen for the user. Further, the operation control unit 301 detects a user operation and changes the screen or updates the display based on the detection result. A data storage unit 302 stores data in the ROM 202 and reads data from the ROM 202 based on requests from other control units. For example, if the user wishes to change a device setting, first, the operation control unit 301 detects information input to the operation unit 206 by the user.

Then, the data storage unit 302 stores the detected information in the ROM 202 based on a request from the operation control unit 301.

A Transmission Control Protocol over Internet Protocol (TCP/IP) control unit 303 transmits network packets via the network I/F 211 based on requests from other control units. Further, the TCP/IP control unit 303 has the function of receiving an external network packet and transmits the received packet to another control unit.

A DHCP control unit 304 performs DHCP communication with the DHCP server 106 to acquire an IP address, a subnet mask, and a lease period of the MFP 101 from the DHCP server 106. The DHCP control unit 304 starts the foregoing acquisition processing at a timing when a link-up is detected, for example, at the time of device activation, or a timing based on the lease period of the IP address assigned by the DHCP server 106. Specifically, if it is determined that the remaining lease period calculated based on a comparison between the current time and the lease period is shorter than a predetermined period, the acquisition processing is performed again to update the lease period.

A network configuration detection unit 305 collects network configuration information about a network being connected and stores network configuration information about a previously-connected network. Network configuration information includes information about another information processing apparatus connected to the same network. A piece of the information is a media access control (MAC) address that physically identifies a default gateway apparatus being connected. According to the present exemplary embodiment, the gateway 104 illustrated in FIG. 1 corresponds to the default gateway apparatus. Further, the network configuration information also includes a MAC address and an IP address of the DHCP server 106 configured to assign an IP address to each client on the network dynamically and a network address assigned to the DHCP server 106 by the DHCP server 106.

Specifically, the network configuration detection unit 305 collects address information as part of the network configuration information based on information included in a response (PACK response) from the DHCP server 106 to a request made based on the DCHP protocol. For example, the IP address for the MFP 101 and the IP address and the MAC address of the DHCP server 106 are collected from the response. Furthermore, network information (IP address, MAC address) about servers, such as a default gateway server, a Domani Name System (DNS) server, and a Lightweight Directory Access Protocol (LDAP) server, is also collected from the response. With the DHCP setting of the MFP 101 disabled, the network configuration detection unit 305 can collect setting values (address information about the MFP 101 and the default gateway) that are manually set for the MFP 101. Furthermore, with the wireless LAN setting of the MFP 101 enabled, the network configuration detection unit 305 makes a request using the Institute of Electrical and Electronics Engineers (IEEE) 801.11 protocols to collect a service set identifier (SSID) of a wireless LAN connection destination router as an example of the collection of network configuration information.

A security setting control unit 306 manages correspondence relationships between each installation environment, such as an internal LAN, a home, or a public space; setting items of security-related functions for the installation environments; and setting values for the setting items. Further, in response to when the user designates an installation environment, the security setting control unit 306 collectively sets the corresponding security-related functions. The settings of the security-related functions are combinations of setting items, such as a setting to encrypt a communication path, a setting to disable a legacy protocol, and a setting to enable a personal firewall, and setting values. Specifically, based on the installation environment, the security setting control unit 306 manages combinations of setting items and setting values that are defined in advance by the vendor of the MFP 101. According to the present exemplary embodiment, a combination of setting items and setting values for an installation environment are defined such that at least one setting value or setting item of the combination is different compared with the combinations of setting items and setting values for the other installation environments. As described above, according to the present exemplary embodiment, a combination of setting items and setting values that are defined in advance for each installation environment and that are different at least partially from those of the other combinations are collectively reflected, whereby a system of collectively reflecting the setting values for the installation environment is provided.

Back to the description of FIG. 3, the security setting control unit 306 refers to or changes setting values stored in the data storage unit 302 by issuing a read request or a write request to the data storage unit 302.

A management system communication unit 307 passes information between the management cloud system 102 and the MFP 101. Specifically, when a setting is changed in the data storage unit 302 of the MFP 101, the management system communication unit 307 sends a notification of the change to the management cloud system 102. This processing enables the management cloud system 102 to identify the settings with which the MFP 101 is operating. Further, the management system communication unit 307 also has the function of receiving a setting change notification and performing processing when the management cloud system 102 issues a setting change instruction. The management system communication unit 307 that has received the setting change notification performs processing to reflect the changed setting value in the data storage unit 302 of the MFP 101. As described above, according to the present exemplary embodiment, information about the MFP 101 is synchronized bi-directionally so that the management cloud system 102 can check and change the information about the MFP 101 as appropriate.

Next, screens displayed on the operation unit 206 of the MFP 101 will be described below with reference to FIGS. 4A to 4C.

Figure 4A:
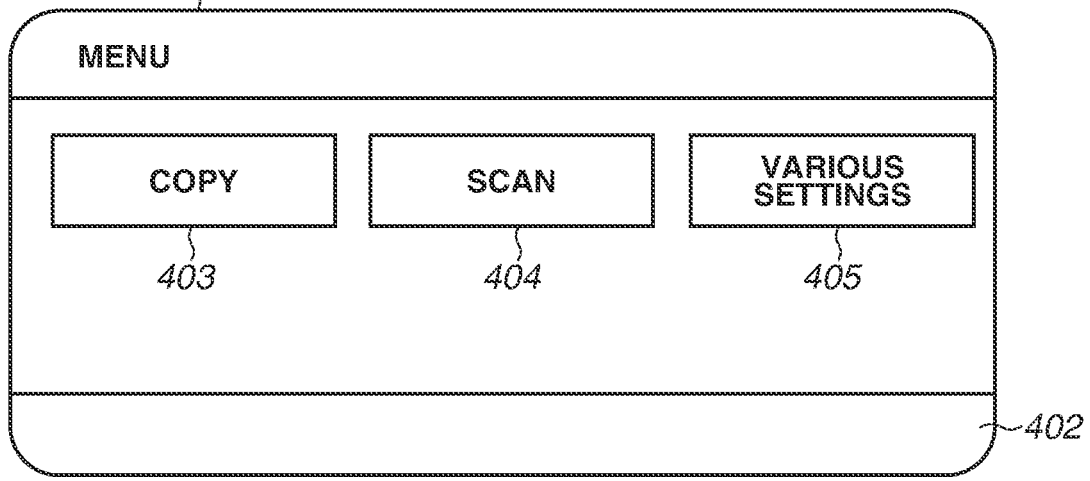
FIGS. 4A to 4C each illustrate an example of a screen displayed on an operation unit of the MFP.

FIG. 4A illustrates a menu screen 401 in normal time. A notification region 402 is a region that is used to provide a notification of information to the user. A copy button 403, a scan button 404, and a various settings button 405 are each used to carry out the corresponding function of the MFP 101.

Figure 4B:
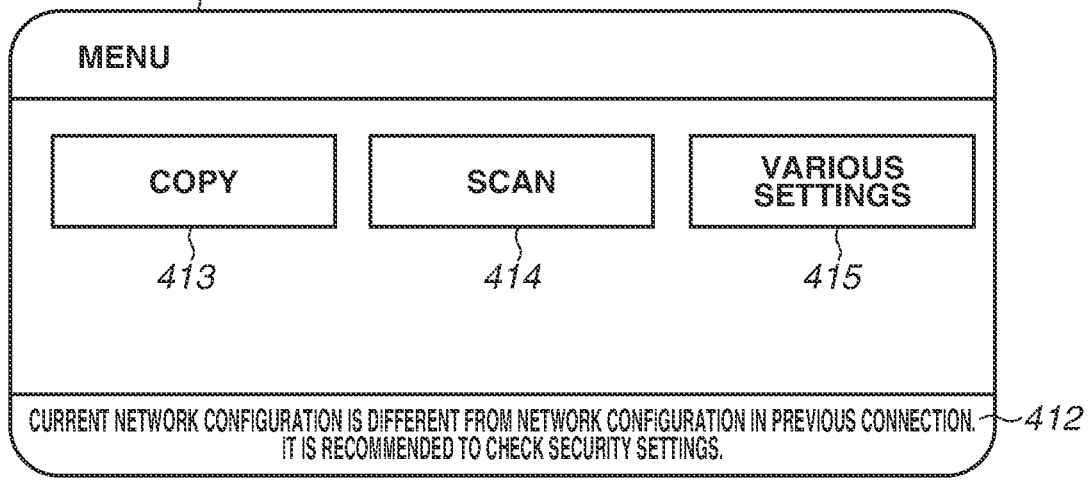

FIG. 4B illustrates a menu screen 411 displayed when a network configuration change described below is detected. A copy button 413, a scan button 414, and a various settings button 415 are similar to those in FIG. 4A. When the network configuration detection unit 305 detects a network configuration change, the operation control unit 301 displays a message indicating the detection thereof in a notification region 412. Specifically, the operation control unit 301 controls presentation of setting information about the security-related functions to the user based on the change in the network environment. Furthermore, if a tap by the user on the notification region 412 where the message is displayed is detected, the operation control unit 301 displays a screen 421 illustrated in FIG. 4C on the operation unit 206.

Figure 4C:
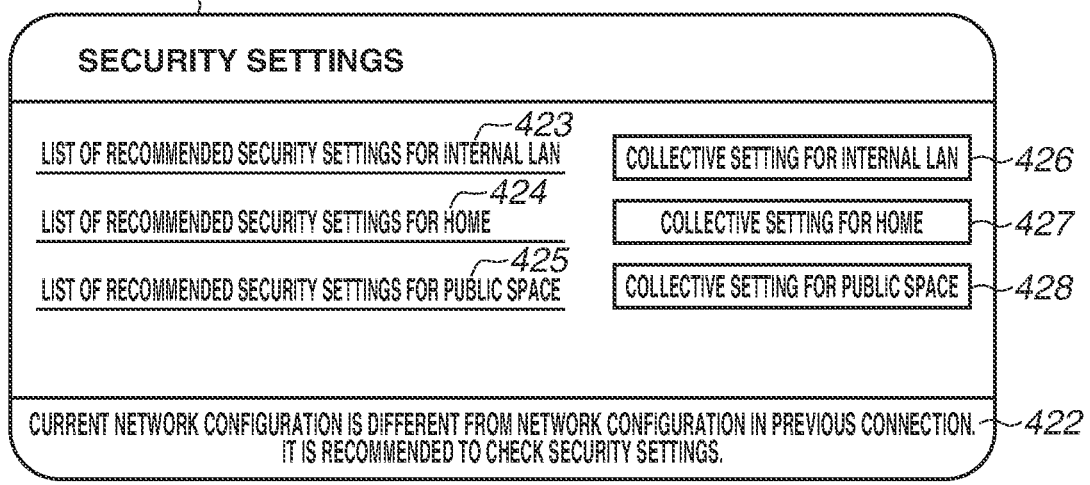

Manuals on the settings of the security-related functions of the MFP 101 and buttons for collective setting are displayed on the screen 421 in FIG. 4C. According to the present exemplary embodiment, on the assumption that the MFP 101 is installed in an internal LAN, a home, or a public space, a suitable security setting manual and a collective setting button are displayed for each installation environment. A link 423 to a list of recommended security settings for an internal LAN is a link for displaying a list of settings that are to be set in a case where the installation environment is an internal LAN. The same applies to a link 424 to a list of recommended security settings for a home and a link 425 to a list of recommended security settings for a public space. A button 426 for collective setting for an internal LAN is a button for collectively setting a series of security settings that are determined as being suitable for a case where the installation environment is an internal LAN. The same applies to a button 427 for collective setting for a home and a button 428 for collective setting for a public space. If the collective setting button 426, 427, or 428 is pressed and the security settings for the MFP 101 are changed, the MFP 101 updates a display state of a notification region 422 to a state without the message. Specifically, after the setting of the security settings is completed, the notification message displayed in the notification region 422 is erased.

Figure 6:
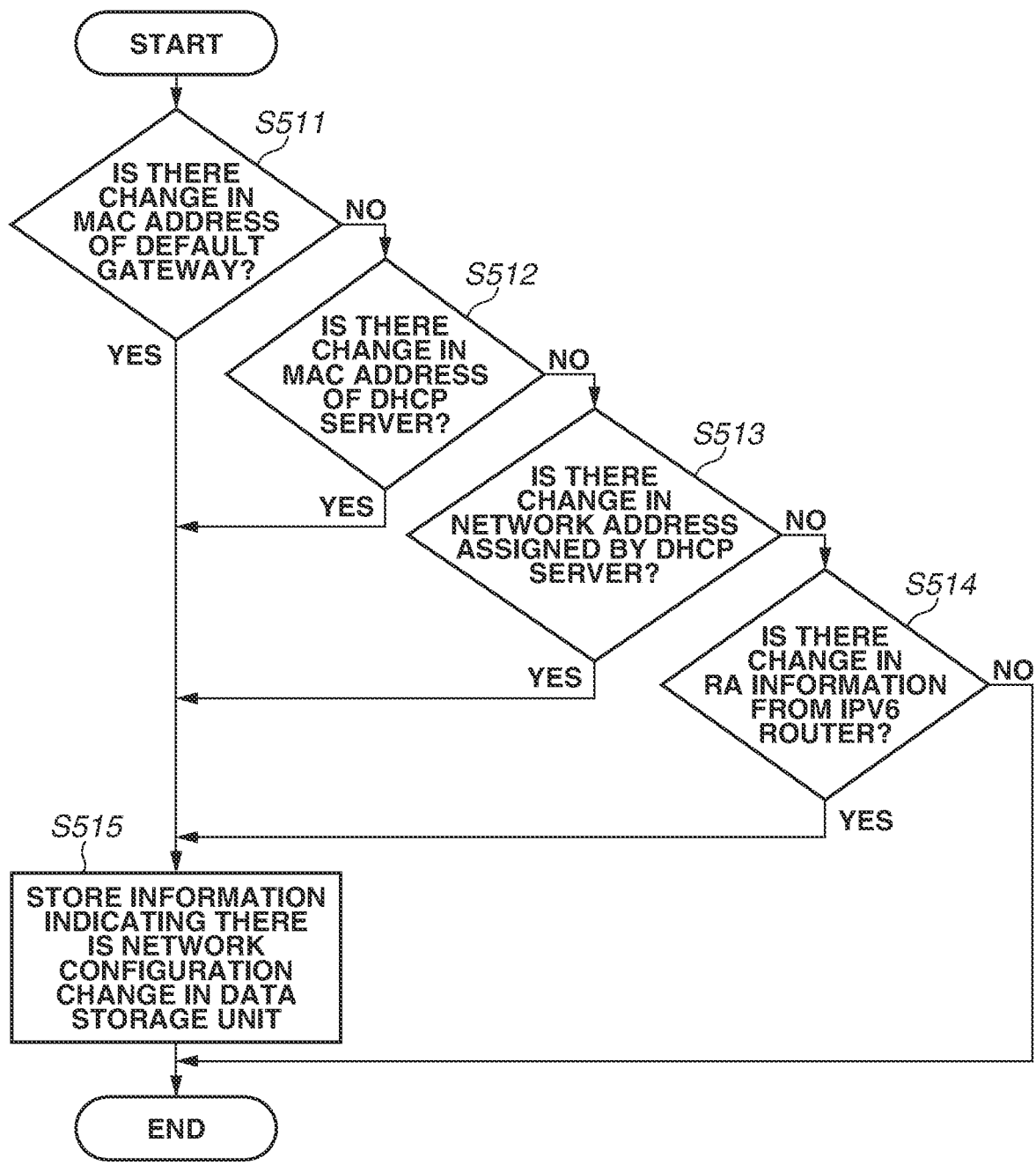
FIG. 6 is a flowchart illustrating an example of a network configuration change detection process performed by the MFP according to the first exemplary embodiment.
Figure 7:
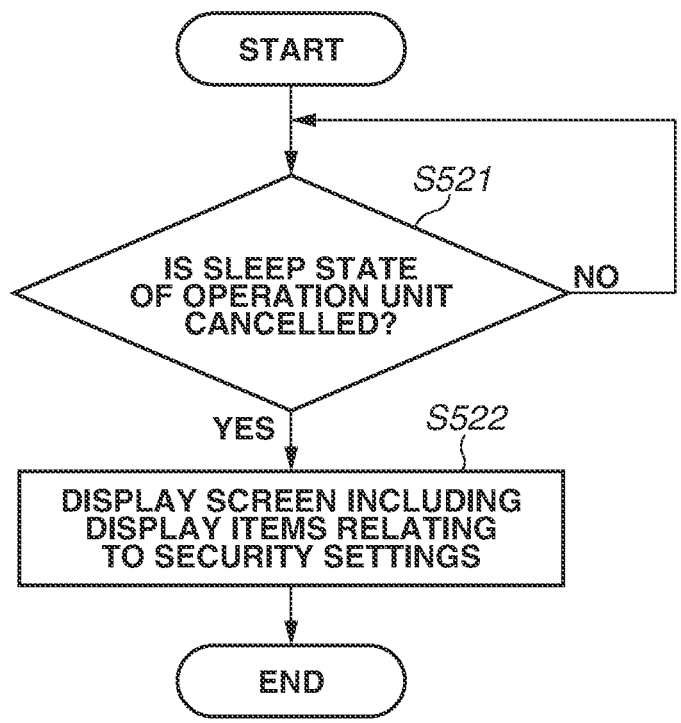
FIG. 7 is a flowchart illustrating an example of a process of controlling display of a screen on the operation unit of the MFP according to the first exemplary embodiment.

Next, a process from the detecting of a network configuration change by the MFP 101 to the displaying of the display items relating to the security settings on the operation unit 206 of the MFP 101 will be described below with reference to FIGS. 5 to 7. Each operation (step) illustrated in flowcharts in FIGS. 5 to 7 is carried out by the CPU 201 by calling a program for implementing a control module stored in the ROM 202 or the storage 204 to the RAM 203 and running the called program. Data transmission/reception processing is performed in collaboration with the network I/F 211. Further, for a clear description of what performs processing, a software module implemented by the CPU 201 is described as a subject. The process illustrated in FIG. 5 is performed when the MFP 101 is activated from a power-off state and operates in a normal mode. In FIG. 5, the steps that relate to the acquisition of network configuration information are extracted and illustrated due to the limited space on this specification.

In step S501, the network configuration detection unit 305 determines whether network configuration information is to be acquired. Specifically, if the network configuration detection unit 305 detects a transition of the network I/F 211 to a link-up state or if the network configuration detection unit 305 determines that it is a timing to transmit an inquiry to the DHCP server 106, the network configuration detection unit 305 determines that network configuration information is to be acquired. A timing to transmit an inquiry to the DHCP server 106 is, for example, a timing based on the lease period of an IP address assigned by the DHCP server 106. If the network configuration detection unit 305 determines that network configuration information is to be acquired (YES in step S501), the processing proceeds to step S502. Otherwise (NO in step S501), the processing proceeds to step S508. A link up indicates a transition from a state where the MFP 101 is not connected to a network to a state where the MFP 101 is connected to a network and becomes ready to communicate with an apparatus on the network. According to the present exemplary embodiment, a link up occurs when the LAN cable is disconnected or connected or when the MFP 101 changes from a power-off state or a power saving state to a normal power state. Further, a link up occurs also when a network setting (e.g., default gateway, IP address) of the network I/F 211 is changed based on a user operation via a network setting screen (not illustrated).

In step S508, the CPU 201 determines whether a shut-down instruction to change an operation mode of the MFP 101 from a normal operation mode to a power-off mode is received. If a shut-down instruction is received (YES in step S508), shut-down processing (not illustrated) is performed, and the processing is ended. Otherwise (NO in step S508), the processing proceeds to step S501 to wait for a condition for acquiring configuration information.

In step S502, the network configuration detection unit 305 acquires the MAC address of a default gateway.

Then, in steps S503 and S504, the network configuration detection unit 305 collaborates with the DHCP control unit 304 to acquire the MAC address of the DHCP server 106 and the network address assigned by the DHCP server 106.

In steps S502 to S504, the network configuration detection unit 305 acquires the MAC address of the default gateway, the MAC address of the DHCP server 106, and the network address assigned by the DHCP server 106 based on information included in a response from the DHCP server 106 to a single request made using the DHCP protocol. While the foregoing three addresses are acquired based on a response to a single request according to the present exemplary embodiment, the acquisition is not limited to the above-described acquisition. For example, the network configuration detection unit 305 can make a plurality of requests and acquire the above-described addresses based on information included in responses to the requests.

Next, in step S505, the network configuration detection unit 305 acquires router advertisement (RA) information from an Internet protocol version 6 (IPv6) router. The RA information includes a prefix to be assigned to a host and default gateway information for use in IPv6 communication.

The network configuration information to be acquired is not limited to the four types of information illustrated in steps S502 to S505. For example, with the wireless LAN setting of the MFP 101 enabled, a further request can be made using the IEEE 801.11 series protocols, and the SSID of a wireless LAN connection destination router can be collected. The acquired network configuration information is used in detecting a network configuration change described below. Also, a further request can be made using the DHCP protocol, and network configuration information can be collected in a response to the request.

In step S506, the network configuration detection unit 305 performs network configuration change detection processing based on the network configuration information acquired in steps S502 to S505 and the stored network configuration information. The detection processing will be described below with reference to FIG. 6.

In step S507, the network configuration detection unit 305 stores the network configuration information acquired in steps S502 to S505 in the data storage unit 302 as network configuration information for use in communication by the MFP 101. The network configuration information stored in step S507 is used as stored network configuration information the next time the condition for acquiring configuration information is satisfied in step S501 and the processing of step S506 is performed.

Next, the network configuration change detection processing by the network configuration detection unit 305 in step S506 will be described below with reference to FIG. 6.

In step S511, the network configuration detection unit 305 compares the MAC address of the default gateway that is acquired in step S502 and the MAC address of the default gateway that is stored in the data storage unit 302, and determines whether there is a difference between the MAC addresses. If the MAC address of the default gateway that is acquired in step S502 and the MAC address of the default gateway that is stored in the data storage unit 302 are different from each other, i.e., if there is a network configuration change (YES in step S511), the processing proceeds to step S515. On the other hand, if the MAC address of the default gateway that is acquired in step S502 and the MAC address of the default gateway that is stored in the data storage unit 302 match, i.e., if there is no network configuration change (NO in step S511), the processing proceeds to step S512.

In step S512, the network configuration detection unit 305 compares the MAC address of the DHCP server 106 that is acquired in step S503 and the MAC address of the DHCP server 106 that is stored in the data storage unit 302, and determines whether there is a difference between the MAC addresses, as in step S511. If there is a difference (YES in step S512), the processing proceeds to step S515, whereas if there is no difference (NO in step S512), the processing proceeds to step S513.

In step S513, the network configuration detection unit 305 compares the network address that is acquired in step S504 and the network address that is stored in the data storage unit 302, and determines whether there is a difference between the network addresses, as in step S511. If there is a difference (YES in step S513), the processing proceeds to step S515, whereas if there is no difference (NO in step S513), the processing proceeds to step S514.

In step S514, the network configuration detection unit 305 compares the RA information that is received from the IPv6 router and is acquired in step S505 and the RA information that is received from the IPv6 router and is stored in the data storage unit 302, and determines whether there is a difference, as in step S511. If there is a difference (YES in step S514), the processing proceeds to step S515, whereas if there is no difference (NO in step S514), the process ends.

In step S515, the network configuration detection unit 305 stores information indicating that there is a network configuration change in the data storage unit 302, and the processing ends.

Further, the network configuration detection unit 305 stores information indicating that there is a network configuration change, as a log in a non-volatile storage device of the MFP 101.

Lastly, a process of displaying the screen 411 indicating that there is a network configuration change on the operation unit 206 of the MFP 101 will be described with reference to FIG. 7. The process illustrated in FIG. 7 is a display control process that is performed if information indicating that there is a network configuration change is stored in step S515 in FIG. 6. The operation control unit 301 refers to the data storage unit 302, and if information indicating that there is a network configuration change is stored, the process is started.

In step S521, the operation control unit 301 checks whether the operation unit 206 is not in a sleep state. If the sleep state is cancelled (YES in step S521), the processing proceeds to step S522. If the operation unit 206 is in the sleep state (NO in step S521), the processing returns to step S521 to wait until the sleep state is cancelled.

In step S522, the operation control unit 301 displays the display items relating to the security settings in the notification region 412 of the screen 411, and the processing ends.

The notification region 412 described above is an example of a method for displaying the display items relating to the security settings in step S522. While the display items relating to the settings are displayed in a status display region provided at the bottom of the operation unit 206 in the above-described example according to the present exemplary embodiment, the display is not limited to the above-described display. For example, information about the settings can be provided to the user on a pop-up window, or the display items relating to the settings can be displayed on a state check screen (not illustrated).

The foregoing processing allows the display items relating to the settings of the security-related functions to be displayed on the operation unit 206 of the MFP 101 if there is a change in the network configuration.

A second exemplary embodiment will be described. A process will be described of ending the display of the display items relating to the security settings according to the first exemplary embodiment based on a determination by the user according to the second exemplary embodiment. Further, a process will be described of not displaying the display items based on a determination by the user even if a network configuration change is detected. The second exemplary embodiment is similar in configuration to the configuration according to the first exemplary embodiment, except that a screen illustrated in FIG. 8 in place of the screen illustrated in FIG. 4C is displayed on the operation unit 206 and that a process illustrated in FIG. 9 in place of the process illustrated in FIG. 7 is performed. Redundant descriptions of configurations similar to those according to the first exemplary embodiment will be omitted as appropriate.

Figure 8:
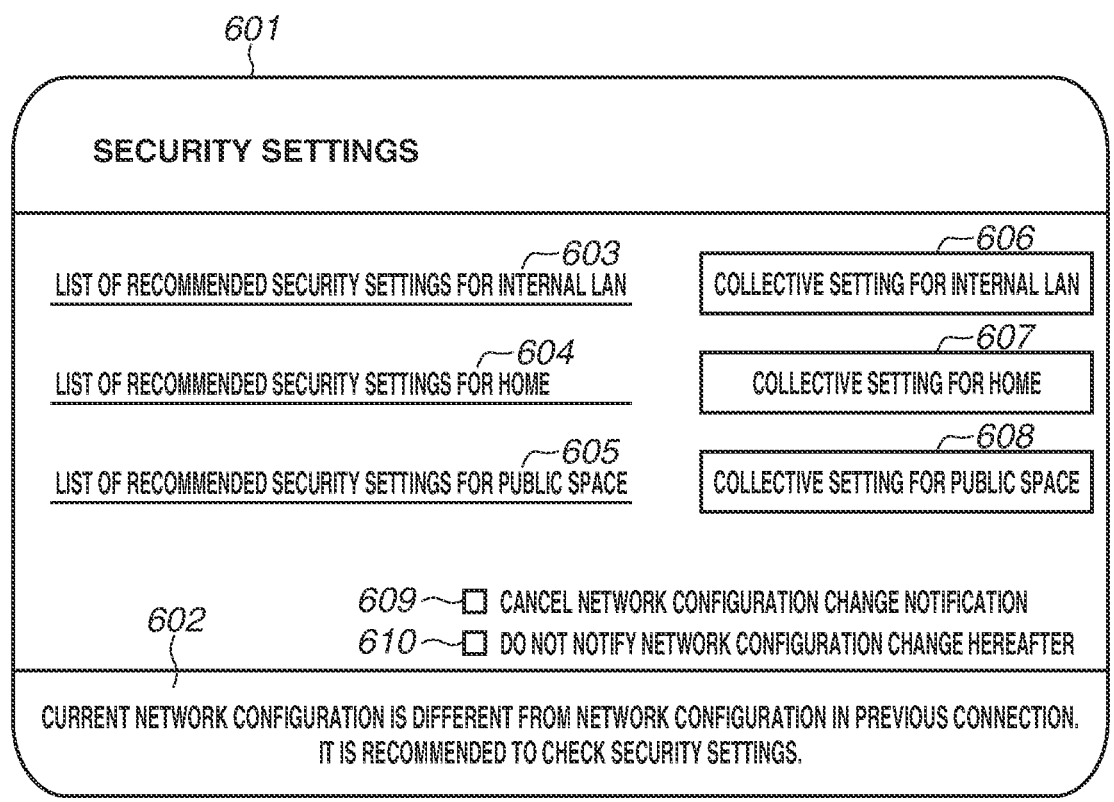
FIG. 8 illustrates an example of a screen displayed on the operation unit of the MFP according to a second exemplary embodiment.

FIG. 8 illustrates an example of a screen that is displayed on the operation unit 206 of the MFP 101 in place of the screen illustrated in FIG. 4C according to the first exemplary embodiment. In FIG. 8, a cancel button 609 for ending the display of the display items relating to the security settings is included in addition to the display items illustrated in FIG. 4C. Further, a do-not-notify button 610 for not displaying the display items even if a network configuration change is detected is also included. A message indicating that a network configuration change is detected is displayed in a notification region 602 as in FIG. 4C.

If the operation control unit 301 detects a selection of the cancel button 609 by the user, the operation control unit 301 updates the display state of the notification region 602 to a state where the above-described message is not included. Specifically, the notification message displayed in the notification region 602 is erased.

Further, if the operation control unit 301 detects a selection of the do-not-notify button 610 by the user, the operation control unit 301 updates the display state of the notification region 602 to the state where the above-described message is not included.

Specifically, the notification message displayed in the notification region 602 is erased. Further, the operation control unit 301 collaborates with the data storage unit 302 and sets an operation setting so that no notification will be provided even if a network configuration change is detected thereafter. The operation setting is stored in the data storage unit 302. The operation setting stored in the data storage unit 302 may be referred to as needed, for example according to a flowchart illustrated in FIG. 9, which is described below.

Figure 9:
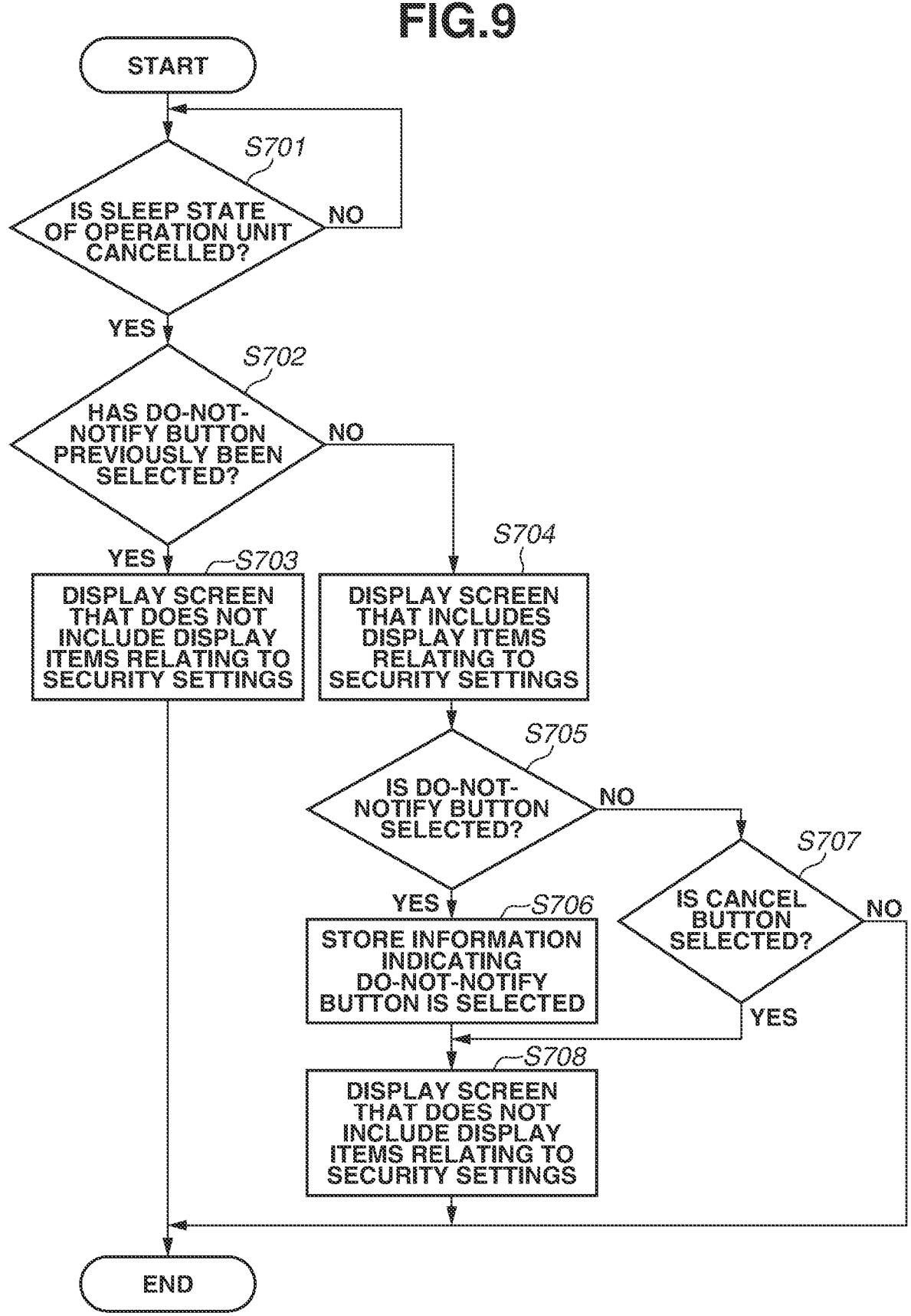
FIG. 9 is a flowchart illustrating an example of a process of controlling display of a screen on the operation unit of the MFP according to the second exemplary embodiment.

Next, a process that is performed by the MFP 101 if the cancel button 609 or the do-not-notify button 610 is selected by the user will be described with reference to FIG. 9. The process illustrated in FIG. 9 is started when information indicating that there is a network configuration change is stored in the data storage unit 302 in step S515 in FIG. 6.

In step S701, the operation control unit 301 checks whether the operation unit 206 is not in the sleep state. If the sleep state is cancelled (YES in step S701), the processing proceeds to step S702. If the operation unit 206 is in the sleep state (NO in step S701), the processing returns to step S701 to wait until the sleep state is cancelled.

In step S702, the operation control unit 301 refers to the data storage unit 302 and determines whether the do-not-notify button 610 has previously been selected on the operation unit 206. If information indicating that the do-not-notify button 610 has previously been selected is stored in the data storage unit 302 (YES in step S702), the processing proceeds to step S703. If information indicating that the do-not-notify button 610 has previously been selected is not stored (NO in step S702), the processing proceeds to step S704.

In step S703, a screen (e.g., screen 401) that does not include the display items relating to the security settings is displayed, and the processing is ended.

In step S704, the operation control unit 301 displays a screen (e.g., the screen 411) that includes the display items relating to the security settings, and the processing proceeds to step S705.

In step S705, the operation control unit 301 determines whether a user operation of selecting the do-not-notify button 610 on the operation unit 206 is received. If a user operation of selecting the do-not-notify button 610 on the operation unit 206 is received by the operation control unit 301 (YES in step S705), the processing proceeds to step S706, or if no selection operation is received (NO in step S705), the processing proceeds to step S707.

In step S706, the operation control unit 301 stores information indicating that the do-not-notify button 610 is selected on the operation unit 206 in the data storage unit 302. The stored information will be used in determining whether the do-not-notify button 610 has previously been selected in step S702. After the processing of step S706 is performed, the processing proceeds to step S708.

In step S707, the operation control unit 301 determines whether a user operation of selecting the cancel button 609 on the operation unit 206 is received. If a user operation of selecting the cancel button 609 is received by the operation control unit 301 (YES in step S707), the processing proceeds to step S708, or if no selection operation is received (NO in step S707), the series of processing is ended.

In step S708, the operation control unit 301 displays the screen that does not include the display items relating to the security settings, and the processing is ended. Specifically, the display of the display items relating to the security settings is ended, and the processing is ended.

The foregoing processing allows the display relating to the settings of the security-related functions to be ended based on a determination by the user, or the display not to be made, even if a network configuration change is detected.

A third exemplary embodiment will be described. A form will be described in which the display control according to the first exemplary embodiment is performed if a user having an administrator privilege logs in to the MFP 101 according to the third exemplary embodiment. The third exemplary embodiment is similar in configuration to the configuration according to the first exemplary embodiment, except that a process illustrated in FIG. 10 in place of the process illustrated in FIG. 7 is performed. Redundant descriptions of configurations similar to those according to the first exemplary embodiment will be omitted as appropriate.

Figure 10:
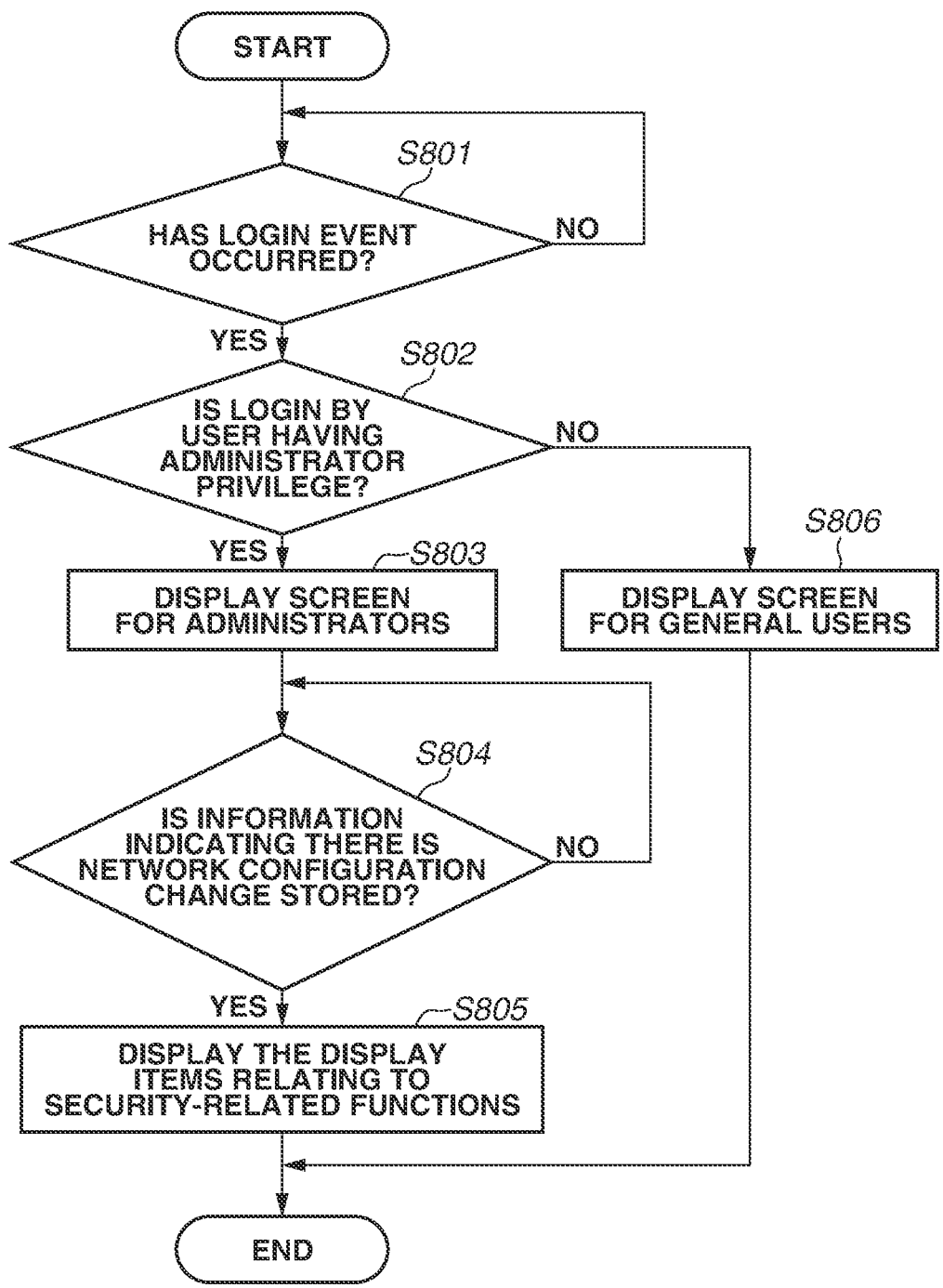
FIG. 10 is a flowchart illustrating an example of a process of controlling display of a screen on the operation unit of the MFP according to a third exemplary embodiment.

FIG. 10 is a flowchart illustrating a process of displaying the display items relating to the security-related functions if a user having an administrator privilege logs in to the MFP 101. The process illustrated in FIG. 10 is an extraction of the control from the waiting for user login to the MFP 101 to the login processing and screen display.

In step S801, the CPU 201 determines whether a login event has occurred. Specifically, for example, if the user ID and the password of a user are input via a login screen (not illustrated) displayed on the operation unit 206 and the user is successfully authenticated based on the input information, the login event of logging the authenticated user in to the MFP 101 occurs. If a login event has occurred (YES in step S801), the processing proceeds to step S802, or if no login event has occurred (NO in step S801), the processing returns to the beginning to wait for a login operation.

In step S802, the CPU 201 checks whether the login is made by a user having an administrator privilege. If the login is made by a user having an administrator privilege (YES in step S802), the processing proceeds to step S803. In step S803, a screen for administrators is displayed. If the login is made by a user without an administrator privilege (NO in step S802), the processing proceeds to step S806. In step S806, a screen for general users is displayed.

In step S804, the operation control unit 301 refers to the data storage unit 302, and if information indicating that there is a network configuration change is stored in the data storage unit 302 (YES in step S804), the processing proceeds to step S805. In step S805, the display items relating to the security-related functions are displayed. If information indicating that there is a network configuration change is not stored in the data storage unit 302 (NO in step S804), the operation control unit 301 waits for a detection of a network configuration change.

The foregoing processing allows the display items relating to the security-related functions to be displayed to a user alone that has an administrator privilege. Specifically, the display of the display items relating to the security-related functions is controlled so that the display items are not displayed to a general user without a privilege to set the security-related functions.

While the screen that includes the display items relating to the settings described in step S805 is displayed after the screen for administrators is displayed (the display screen is updated and the display items are displayed on the screen for administrators) in the above-described example according to the present exemplary embodiment, the present exemplary embodiment is not limited to those described above. For example, if it is determined that the login is made by an administrator in step S802, the determination in step S804 is performed, and whether to include the display items in the screen for administrators can be determined in displaying the screen based on the result of the determination in step S804.

A fourth exemplary embodiment will be described. In the above-described cases according to the first to third exemplary embodiments, the network configuration change detection processing illustrated in FIG. 6 is performed by the network configuration detection unit 305 of the MFP 101, and the display items relating to the security-related functions are displayed on the operation unit 206 of the MFP 101. A case will be described where the network configuration change detection processing is performed by the management cloud system 102 and the display items are displayed on a web browser of an external apparatus according to the fourth exemplary embodiment. The communication system illustrated in FIG. 1, the hardware configuration of the MFP 101 illustrated in FIG. 2, and the software configuration of the MFP 101 illustrated in FIG. 3 are similar to those according to the first exemplary embodiment.

Figure 11:
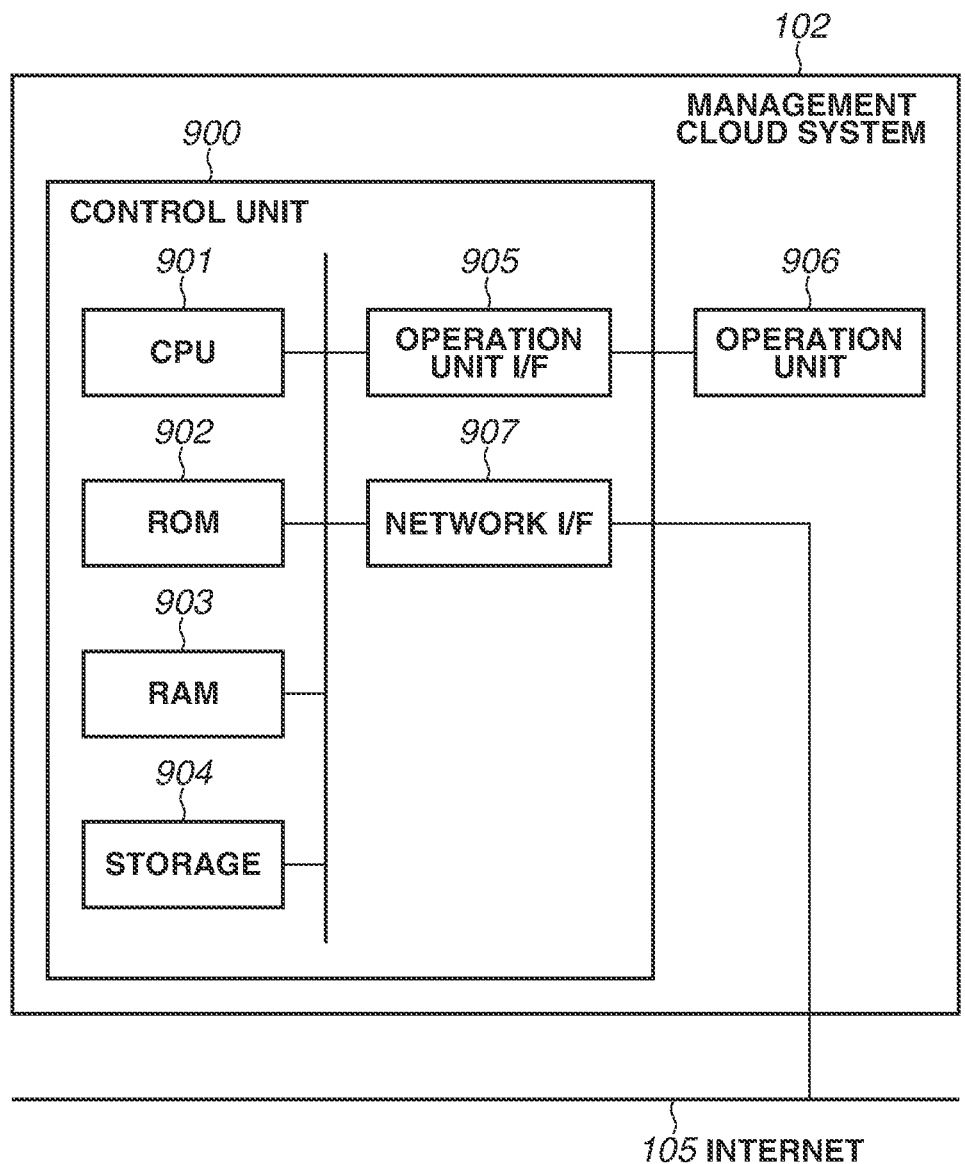
FIG. 11 illustrates an example of the hardware configuration of a management cloud system according to a fourth exemplary embodiment.

A hardware configuration of the management cloud system 102 configured to perform the network configuration change detection processing will be described with reference to FIG. 11.

A control unit 900 including a CPU 901 generally controls the management cloud system 102. A ROM 902 is used to store programs to be run by the CPU 901. A RAM 903 is used to temporarily store data for use by the CPU 901.

A storage 904 stores various programs and various settings information. As described above, the hardware components such as the CPU 901, the ROM 902, the RAM 903, and the storage 904 constitute a so-called computer.

An operation unit I/F 905 connects an operation unit 906 and the control unit 900. A network I/F 907 is connected to the Internet 105.

Figure 12:
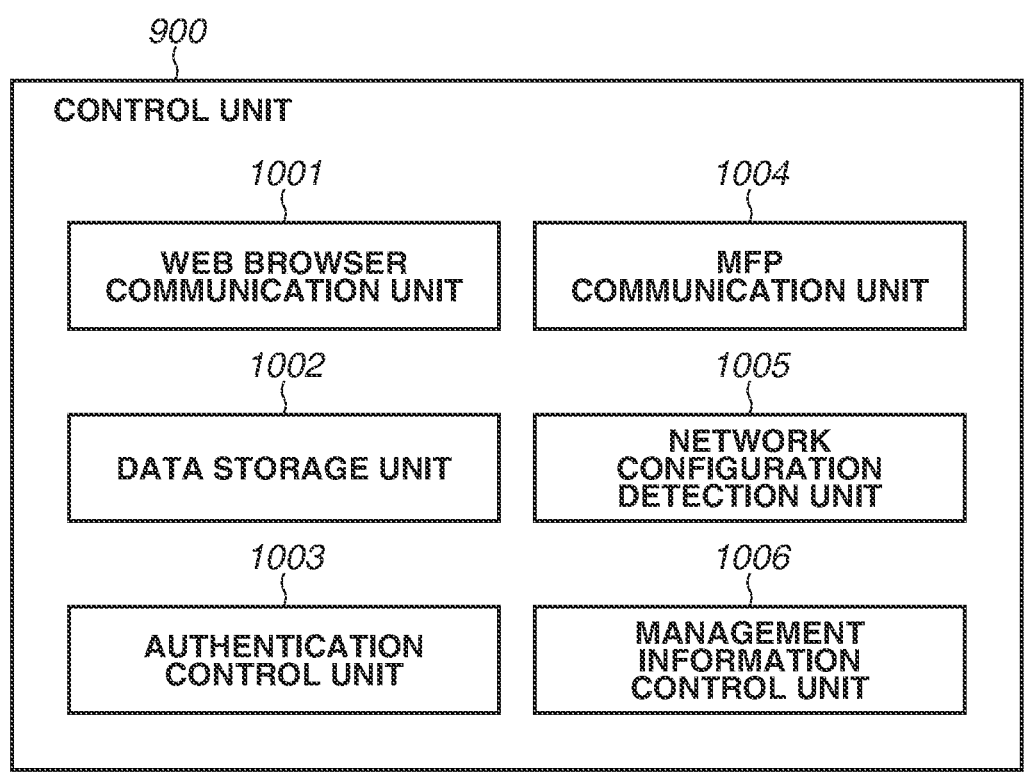
FIG. 12 illustrating an example of the software configuration of the management cloud system according to the fourth exemplary embodiment.

A software configuration of the management cloud system 102 will be described with reference to FIG. 12. Each component illustrated in FIG. 12 is implemented by the CPU 901 by running a program stored in the ROM 902 and corresponding to the component.

A web browser communication unit 1001 displays a screen for the user based on a request from a web browser running on the PC 107. Further, the web browser communication unit 1001 detects a user operation and changes the screen or updates the display based on the detection result. A data storage unit 1002 stores data in a distributed resource on the cloud or reads data from the distributed resource based on a request from another control unit. For example, if the user changes a device setting, first, the user transmits details of the change to the web browser communication unit 1001. Then, the data storage unit 1002 stores the transmitted details as setting values in the distributed resource on the cloud based on a request from the web browser communication unit 1001.

An authentication control unit 1003 performs user authentication using authentication information transmitted to the web browser communication unit 1001 and account information stored in the data storage unit 1002.

A MFP communication unit 1004 controls communication with the MFP 101, and if a setting value for the MFP 101 or network configuration information is received, the MFP communication unit 1004 stores the received setting value or the received information in the data storage unit 1002.

A network configuration detection unit 1005 acquires network configuration information from the data storage unit 1002 and compares network configuration information about the network being connected and network configuration information about the previously-connected network. If a network configuration change is detected, information indicating the detection is stored in the data storage unit 1002.

A management information control unit 1006 performs processing of generating details of management information to be displayed to the user via the web browser communication unit 1001. For example, if information indicating that there is a change in network configuration information will be displayed, data stored in the data storage unit 1002 is processed, and appropriate display information is generated.

Screens that are displayed on the web browser running on the PC 107 will be described with reference to FIGS. 13A and 13B. Management screens 1101 and 1111 in FIGS. 13A and 13B are displayed based on information transmitted from the web browser communication unit 1001.

FIG. 13A illustrates the management screen 1101 at a normal time. A network diagnostic status notification section 1102 is used to provide information indicating whether a network configuration change described below is detected, and at a normal time, information indicating that no network configuration change is detected is provided. A notification region 1103 is a region that is used to provide a notification of information to the user.

FIG. 13B illustrates the management screen 1111 displayed if a network configuration change is detected. If a network configuration change is detected, information indicating the detection is shown on a network diagnostic status notification section 1112. Further, a message that indicates the detection to prompt the user to set the security settings is displayed in a notification region 1113. Further, a security setting manual 1110 is displayed on the management screen 1111. According to the present exemplary embodiment, on the assumption that the MFP 101 is installed in an internal LAN, a home, or a public space, an appropriate security setting manual for each installation environment is displayed. A link 1114 to a list of recommended security settings for an internal LAN is a link to a web manual that displays a list of settings to be set for an internal LAN as the installation environment. The same applies to a link 1115 to a list of recommended security settings for a home and a link 1116 to a list of recommended security settings for a public space. In consideration of cases where the setting items slightly vary with the device type or model, different web manuals for different management target device types or models can be provided. In this case, the management information control unit 1006 identifies the device type information about a management target MFP registered in the management cloud system 102 by the user. Then, the management information control unit 1006 generates display information including a link for displaying a web manual for the identified device type information. This processing allows an appropriate link for the management target device type or model to be displayed.

While the screens according to the present exemplary embodiment are configured to display information about the single MFP 101, a list of all MFPs associated with the account of the user can be displayed for the user having the MFPs. Then, a notification of a list of the MFPs with a warning can be provided. Besides, a diagram, such as a pie chart, can be used to specify the proportions of the MFPs with a warning and the MFPs without a warning, whereby the user can recognize the entire state at first sight. Further, a notification indicating that there is no issue at large can be provided if there are no MFPs with a warning.

Next, a process of acquiring network configuration information, detecting a network configuration change, and displaying a screen on the web browser will be described.

First, the network configuration detection unit 305 of the MFP 101 acquires network configuration information by performing steps S501 to S505 in FIG. 5 as in the first exemplary embodiment. Then, the management system communication unit 307 of the MFP 101 transmits the network configuration information acquired by the network configuration detection unit 305 to the management cloud system 102. Further, the MFP communication unit 1004 of the management cloud system 102 receives the network configuration information from the MFP 101. The transmission of the network configuration information from the MFP 101 to the management cloud system 102 is performed, for example, at timings at which the MFP 101 acquires the network configuration information or at regular intervals.

After the network configuration information is stored in the data storage unit 1002 of the management cloud system 102, the network configuration change detection processing is started. The procedure of the detection is similar to that illustrated in FIG. 6, except that each step is performed by the network configuration detection unit 1005 of the management cloud system 102 in place of the network configuration detection unit 305 of the MFP 101. Further, if there is a network configuration change, information indicating that there is a network configuration change is stored in the data storage unit 1002 of the management cloud system 102.

The configuration information that is received from the MFP 101 and the configuration information that is stored in the data storage unit 1002 are compared to detect a change. After the detection processing is ended, the configuration information that is received from the MFP 101 is stored in the data storage unit 1002. The configuration information that is stored at this time will be used as stored configuration information the next time the change detection processing is performed.

Next, a process of displaying the management screen 1111 on the web browser will be described. As described above, the web browser communication unit 1001 of the management cloud system 102 displays a screen for the user based on a request from the web browser running on the PC 107.

According to the present exemplary embodiment, if an acquisition request to acquire a management screen is received from the web browser, the management cloud system 102 provides a management screen corresponding to the acquisition request to the web browser.

Specifically, the user operates the web browser on the PC 107 and performs an operation to access a management screen of the management cloud system 102. The web browser having detected the operation transmits a management screen acquisition request to the management cloud system 102.

The web browser communication unit 1001 of the management cloud system 102 having received the management screen request responds with a management screen that varies depending on whether information indicating that a network configuration change is detected is stored in the data storage unit 1002. If information indicating that a network configuration change is detected is stored in the data storage unit 1002, the web browser communication unit 1001 transmits web data corresponding to the management screen 1111 as a response to the web browser from which the management screen request is transmitted. The foregoing process allows the display items including information about the settings relating to the security-related functions to be displayed on the web browser.

In place of displaying the security setting manual 1110 on the management screen 1111, a link for displaying the security setting manual 1110 can be displayed on the management screen 1111. The notification region 1113 can be configured as a link for displaying the security setting manual 1110.

Further, the collective setting buttons according to the first exemplary embodiment can be displayed on the management screen 1111. A process in this case will be described. First, the web browser communication unit 1001 receives information indicating that a collective setting button corresponding to a specific installation environment on the management screen 1111 is pressed by the user from a web browser of an external apparatus. Then, the web browser communication unit 1001 transmits a request for collective setting for the MFP 101 to the MFP communication unit 1004. The MFP communication unit 1004 having received the request for collective setting transmits a setting request indicating that the collective setting corresponding to the specific installation environment is to be performed to the MFP 101. The management system communication unit 307 of the MFP 101 receives the setting request. Then, the security setting control unit 306 of the MFP 101 having received the setting request changes the security settings for the MFP 101. The foregoing process allows the security-related functions of the MFP 101 to be collectively set from the web browser on the PC 107.

As in the second exemplary embodiment, the management screen 1111 can include a cancel button for ending the display of the display items relating to the security settings. Further, the management screen 1111 can include a do-not-notify button for not displaying the display items even if a network configuration change is detected.

<Other Exemplary Embodiments>

Also, some embodiments are implemented by the following process. Specifically, a program for carrying out one or more functions according to the above-described exemplary embodiments is supplied to a system or an apparatus via a network or a storage medium, and one or more processors of a computer of the system or the apparatus read the program and run the read program. Further, some embodiments are implemented by a circuit (e.g., application-specific integrated circuit (ASIC), field-programmable gate array (FPGA)) that carries out one or more functions.

The present disclosure provides an information processing apparatus that provides information about settings of security-related functions of an information device to a user if a change occurs in a network environment.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-199139, which was filed on Dec. 8, 2021 and which is hereby incorporated by reference herein in its entirety.

What is claimed is:

1. An information processing apparatus comprising:
one or more memories; and
one or more processors in communication with the one or more memories, wherein the one or more processors and the one or more memories are configured to:
transmit a request to acquire network configuration information about a dynamic host configuration protocol (DHCP) server that assigns address information to the information processing apparatus;
store, as first network configuration information, the network configuration information acquired based on the request in storage;
detect a change based on the first network configuration information and second network configuration information acquired newly by the request unit; and
display a first display item on a screen based on the detection of the change, the first display item relating to a setting of a security-related function of the information processing apparatus.

2. The information processing apparatus according to claim 1, wherein the one or more processors and the one or more memories are further configured to:
acquire the address information assigned to the information processing apparatus;
store, as first address information, the address information in the storage;
in a case where the change is not detected, detect a change based on the first address information and second address information newly acquired; and
display the first display item on the screen based on the detection of the change based on the address information.

3. The information processing apparatus according to claim 1, wherein the first display item is a display item including a message prompting a user to change the setting of the security-related function.

4. The information processing apparatus according to claim 1,
wherein the one or more processors and the one or more memories are further configured to, in a case where the first network configuration information and the second network configuration information are different from each other,
determine that the change is detected, and
display the first display item; and
wherein the one or more processors and the one or more memories are further configured to, in a case where the first network configuration information and the second network configuration information match,
determine that the change is not detected, and
not display the first display item.

5. The information processing apparatus according to claim 1, wherein the one or more processors and the one or more memories are further configured to display a second display item for collectively setting the security-related function of the information processing apparatus for a use environment of the information processing apparatus.

6. The information processing apparatus according to claim 5,
wherein the information processing apparatus manages a group of different setting values each associated with a corresponding use environment among a plurality of use environments,
wherein the second display item is a display item for receiving a selection of one item among a plurality of items associated with the plurality of use environments from a user, and
wherein in response to when the selection is received, the setting of the security-related function is set based on the group of setting values managed in association with one use environment corresponding to the selected item.

7. The information processing apparatus according to claim 5, wherein in response to when the first display item is pressed, the second display item is displayed.

8. The information processing apparatus according to claim 1, wherein the one or more processors and the one or more memories are further configured to receive an operation of ending the display of the first display item.

9. The information processing apparatus according to claim 1,
wherein the one or more processors and the one or more memories are further configured to display the first display item on the screen based on the detection of the change and a predetermined setting, and
wherein the predetermined setting is a setting that is set by a user to display or not display the first display item in a case where the change is detected.

10. The information processing apparatus according to claim 1, wherein the network configuration information acquired based on the request includes at least one of a media access control (MAC) address of a default gateway, a MAC address of the DHCP server, or the network address assigned by the DHCP server.

11. The information processing apparatus according to claim 1, wherein the request is an inquiry about network configuration information to be assigned to the information processing apparatus to a network.

12. The information processing apparatus according to claim 11, wherein a timing of the request is at least one of a timing at which a link up of the information processing apparatus is detected or a timing to transmit an inquiry to the DHCP server.

13. The information processing apparatus according to claim 1, wherein the screen is a screen that is displayed in a case where a user having an administrator privilege logs in to the information processing apparatus.

14. The information processing apparatus according to claim 1, wherein the screen is a screen that is displayed on a web browser on an external apparatus in a case where the information processing apparatus receives a request to acquire the screen via the web browser.

15. A control method comprising:
transmitting a request to acquire network configuration information about a dyanmic host configuration protocol (DHCP) server that assigns address information to an information processing apparatus;
storing, as first network configuration information, the network configuration information acquired based on the request;
detecting a change based on the stored first network configuration information and second network configuration information newly acquired in the transmitting; and
displaying a first display item on a screen based on the detection of the change, the first display item relating to a setting of a security-related function of the information processing apparatus.

16. A non-transitory computer-readable storage medium that stores computer-executable instructions for executing a method for controlling an information processing apparatus, the method comprising:
transmitting a request to acquire network configuration information about a dynamic host configuration protocol (DHCP) server that assigns address information to an information processing apparatus;
storing as first network configuration information the network configuration information acquired based on the request;
detecting a change based on the stored first network configuration information and second network configuration information newly acquired in the transmitting; and
displaying a first display item on a screen based on the detection of the change, the first display item relating to a setting of a security-related function of the information processing apparatus.

\* \* \* \* \*